UNITED STATES PATENT OFFICE.

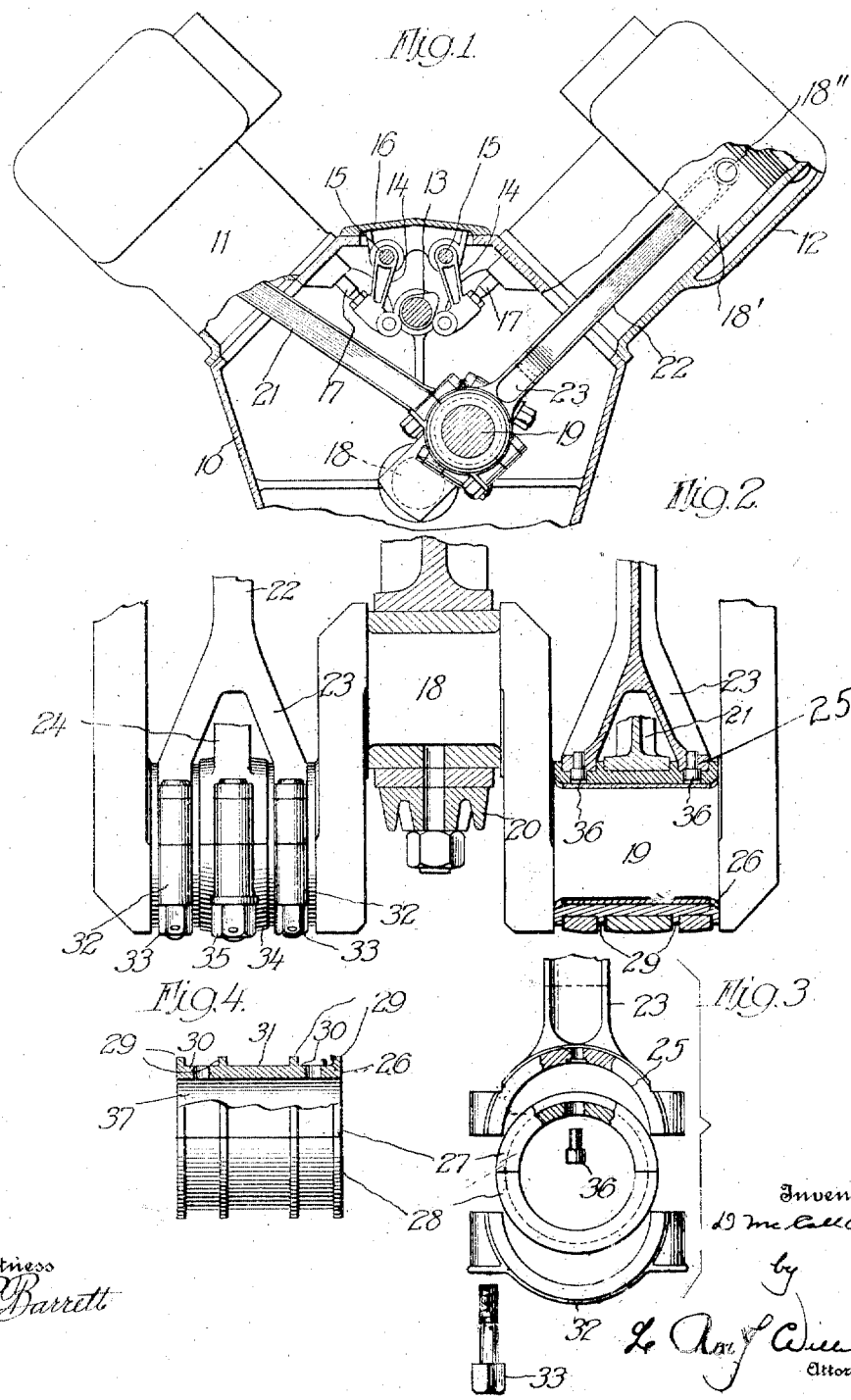

D'ORSAY McCALL WHITE, OF DETROIT, MICHIGAN, ASSIGNOR TO CADILLAC MOTOR CAR COMPANY, OF DETROIT, MICHIGAN, A CORPORATION OF MICHIGAN.

BEARING CONSTRUCTION.

1,244,669.     Specification of Letters Patent.      Patented Oct. 30, 1917.

Application filed November 18, 1915. Serial No. 62,087.

*To all whom it may concern:*

Be it known that I, D'ORSAY McCALL WHITE, a loyal subject of the King of England, and resident of Detroit, Wayne county, State of Michigan, have invented certain new and useful Improvements in Bearing Constructions, of which the following is a specification.

This invention relates to hydrocarbon motors, and particularly motors of the so-called V type.

More particularly, this invention relates to bearings which are especially adapted for use in lower or big ends of connecting rods, such as in motors where it is desired to connect a pair of rods to a single throw or crank of a crank shaft.

One of the objects of this invention is to provide a novel and improved bearing for connecting rods which are arranged in pairs, with one rod of the pair forked or yoked to embrace the adjacent end of another rod arranged between the yoke arms, such an arrangement being especially adapted for use in the construction of motors of the V type.

Another object is to provide the lower ends of a pair of connecting rods arranged on a single crank, with a simple and efficient combined radial and thrust bearing between the various parts, such as the two adjacent rods and the crank shaft.

Another object is to provide a bearing which will maintain the lower ends of the rod with means for bracing the same and maintaining them in proper spaced relation.

Other objects will appear from the following description taken in connection with the accompanying drawings, which form part of this specification, and in which:

Figure 1 is a transverse view of a V type motor embodying this invention;

Fig. 2 is a fragmentary view of a crank shaft showing a side elevation and a longitudinal vertical section of the lower end connecting rod bearing, shown in Fig. 1;

Fig. 3 illustrates end views of the parts making up an assembly of the form of bearing illustrated in the other views; and Fig. 4 is a detail view with portions broken away, of a preferred form of journal member.

Referring to the drawings, 10 illustrates the crank case, on which is suitably arranged in V relation, opposite each other, a pair of cylinder blocks 11 and 12. A valve operating mechanism, comprising a cam shaft 13 suitably mounted in the crank case, rocker arms 14 pivoted at 15 in a cover 16, and tappets 17, are also shown.

It will also be understood that the cylinders are provided with the usual pistons 18', which may be connected, as by the usual piston pins 18'' to connecting rods, which will be hereinafter described. A crank shaft 18, provided with a plurality of throws or cranks 19 may be mounted in bearings in any well known manner, in the crank case 10, as shown in Fig. 2, at 20.

In motors of the V type, where the cylinders 11 and 12 are arranged opposite each other so that their respective axes intersect, it is desirable to have a pair of connecting rods, such as 21 and 22, connected to a single crank or throw 19, of the crank shaft 18. One rod of each of the pairs has a yoked or forked end 23 forming a bearing member, the other rod end 24, which also forms a bearing member, fitting within, or being embraced by, the yoked arms 25 of the rod 22.

A common bushing or journal member 26, composed of two semi-cylindrical parts 27 and 28 may be arranged on each crank. This member is provided with a plurality of flanged portions 29, which form a pair of grooves, or bearing surfaces 30, adjacent each end thereof, and an intermediate groove or bearing surface 31 is also formed therein between the outer grooves.

The yoked arms, or bearing surfaces 25 may be fitted in the outer grooves 30 and the straight rod end 21 may have its bearing member 24 fitted in the intermediate bearing surface 31. Two bearing caps 32 and stud bolts 33 may be provided for securing the yoked rod 22 in position, separate caps being secured to each of the arms 23. A single cap 34 and stud bolt 35 may be provided for the rod 21. Pins 36 may be pressed into position for fixing one of the rod ends to the journal member 26, so as to cause one of the rod ends and the journal member to move together. The other rod end may be left free to turn on this bushing. It will be seen that the full length of the inner face 37 of the journal member 26 has a radial bearing surface common to both rod ends; and where the movement is relatively small, that is, between the two rod ends 24 and 25, respectively, the small outer surface or groove 31 is sufficient.

As the two connecting rods of a pair, and the crank shaft, are generally constructed of similar metal, such as steel, it is not desirable that the moving portions of these parts should be in direct contact, as the friction would be relatively great. Therefore, the journal member 26, which may be of bronze or other suitable bearing metal, is interposed between these various parts to minimize the friction and wear caused thereby.

However, it will be seen that in addition to serving as a radial bearing, as heretofore described, it will be understood that this journal member performs numerous other functions, as will now appear. Among them, are that the flanged portions 29 serve as lateral or thrust bearing surfaces between each of a pair of connecting rod ends. They also serve to maintain the rods of each pair in proper spaced relation and prevent the yoked arms 25 from either binding or spreading.

While I have described, and will specifically claim, a preferred form of my invention, it will be obvious that various modifications and changes may be made, by one skilled in the art, without departing from the spirit and scope of my invention.

Having thus described my invention, what I claim and desire to secure by Letters Patent is:—

1. In a bearing, the combination of a shaft, a journal member thereon comprising relatively stationary sections and provided with a flange, a pair of split bearing members arranged on said journal member on opposite sides of said flange, said bearing members being adapted to move relative to each other, and means for maintaining said parts in operative position.

2. In a bearing, the combination of a shaft, a journal member thereon comprising relatively stationary sections and provided with a circumferential flange, a pair of split bearing members arranged on said journal member on opposite sides of said flange, one of said bearing members being fixed relative to said journal member and the other of said bearing members being adapted to move relatively thereto.

3. In a bearing, the combination of a shaft, a journal member thereon comprising relatively stationary sections and provided with a plurality of circumferential grooves, a plurality of split bearing members set in said grooves, and means for maintaining said parts in position.

4. In a bearing, the combination with a shaft, a journal member thereon comprising relatively stationary sections and provided with a flanged portion arranged adjacent each end thereof, a plurality of split bearing members sleeved on said journal member intermediate said flanged portion, and means for maintaining said parts in position.

5. In a bearing, the combination with a shaft, and a plurality of split bearing members, of a journal member interposed between said bearing members and said shaft, said journal member having means comprising relatively stationary sections and for spacing one of said bearing members from another and forming a bearing therebetween.

6. In a bearing, the combination with a crank pin, a plurality of connecting rods having split portions adapted to be journaled thereon, of a journal member comprising relatively stationary sections and arranged on said crank pin, one of said connecting rods being provided with forked bearing portions adapted to be sleeved on said journal member, the other of said connecting rods having a bearing portion adapted to be sleeved on said journal member intermediate said forked portions, said journal member being provided with means for maintaining said connecting rods in spaced relation, said means also providing a bearing therebetween.

7. In a bearing, the combination with a crank pin, a plurality of connecting rods having split portions adapted to be journaled thereon, of a journal member comprising relatively stationary sections and arranged on said crank pin, one of said connecting rods being provided with forked bearing portions adapted to be sleeved on said journal member, the other of said connecting rods having a bearing portion adapted to be sleeved on said journal member intermediate said forked portions, said journal member being provided with means for maintaining said connecting rods in spaced relation.

8. In a bearing, the combination with a crank pin, and a pair of connecting rods having split portions adapted to be journaled thereon, of a journal member comprising relatively stationary sections and arranged on said crank pin and provided with circumferential grooves arranged adjacent each end thereof, said journal member also being provided with an intermediate groove, one of said connecting rods having a forked portion provided with a pair of bearing members each of which is adapted to be fitted in one of said end grooves, the other of said connecting rods having a bearing portion adapted to be fitted in said intermediate groove, and means for maintaining said parts in operative relation.

9. In a bearing, the combination with a crank pin, and a pair of connecting rods having split portions adapted to be journaled thereon, of a journal member comprising relatively stationary sections and arranged on said crank pin and provided with circumferential grooves arranged adjacent each end thereof, said journal member also being provided with an intermediate groove, one of said connecting rods having a forked portion provided with a pair of bearing members each of which is adapted to be fitted in one of said end grooves, the other of said connecting rods having a bearing portion adapted to be fitted in said intermediate groove, and means for maintaining said journal member and said forked portions of said connecting rod in fixed relation.

10. In a bearing, the combination with a crank pin, and a pair of connecting rods having split portions adapted to be journaled thereon, a journal member comprising relatively stationary sections and arranged on said crank pin, said journal member being provided with circumferential flanged portions, one of said connecting rods being forked at its bearing end and adapted to embrace the bearing end of the other rod, said rods being arranged on opposite sides of said flanged portions and adapted to be held thereby in proper spaced relation.

In testimony whereof I affix my signature in the presence of two witnesses.

D. McCALL WHITE

Witnesses:
RICHARD HARFST,
F. L. DAVIS.